United States Patent [19]

Sheldon

[11] 4,405,851

[45] Sep. 20, 1983

[54] APPARATUS FOR TRANSFER OF METALLIC MATERIALS BY ELECTRIC DISCHARGE

[75] Inventor: Gary L. Sheldon, Pullman, Wash.

[73] Assignee: Washington State University Research Foundation, Inc., Pullman, Wash.

[21] Appl. No.: 272,641

[22] Filed: Jun. 11, 1981

[51] Int. Cl.³ .............................................. B23P 1/18
[52] U.S. Cl. ............................... 219/76.13; 219/76.11
[58] Field of Search .................... 219/76.13, 76.11, 75, 219/69 P, 76.1

[56] References Cited

U.S. PATENT DOCUMENTS

| | | | |
|---|---|---|---|
| 2,835,784 | 5/1958 | Williams | 219/69 P |
| 3,036,197 | 5/1962 | Bruma | 219/69 |
| 3,097,291 | 7/1963 | Adcock | 219/76 |
| 3,098,150 | 7/1963 | Inoue | 219/69 |
| 3,268,705 | 8/1966 | Inoue | 219/76.13 |
| 3,277,266 | 10/1966 | Blaszkowsky | 219/76.13 |
| 3,277,267 | 10/1966 | Blaszkowski | 219/76.13 |
| 3,316,381 | 4/1967 | Gibson | 219/76 |
| 3,415,970 | 12/1968 | Cline | 219/70 |
| 3,415,971 | 12/1968 | Shaffer | 219/76 |
| 3,524,956 | 8/1970 | Rocklin | 219/76 |
| 3,614,373 | 10/1971 | Skilling | 219/69 V |
| 3,617,680 | 11/1971 | Grosskopf | 219/69 |
| 3,768,343 | 10/1973 | Rocklin | 219/70 |
| 3,832,514 | 8/1974 | Antonov | 219/76.13 |
| 3,909,581 | 9/1975 | Stone et al. | 219/75 |
| 3,969,601 | 7/1975 | Rocklin | 219/69 |

FOREIGN PATENT DOCUMENTS

| | | | |
|---|---|---|---|
| 756727 | 9/1956 | United Kingdom . | |
| 563257 | 7/1977 | U.S.S.R. | 219/76.13 |

OTHER PUBLICATIONS

Article by E. H. Thornton and R. G. Davies in "Metals Technology", copyrighted 1979 by Metals Society, 1 Carlton House, Terrance, London SW1Y5DB, pp. 25–32.

Primary Examiner—C. C. Shaw
Attorney, Agent, or Firm—Wells, St. John & Roberts

[57] ABSTRACT

An apparatus and process for depositing metal from one conductor to another by electrode deposition. One conductor, the electrode, may remain in contact with the other conductor, the workpiece, as the electrode is continuously oscillated about a central electrode axis. Short duration, high amperage charges are directed through the oscillating electrode and the workpiece. The charge duration is controlled by the charging rate of a capacitor in a charging circuit. The rate of capacitor discharge is prescribed by an independently triggered thyristor. Extremely short duration discharges at a high discharge frequency results in deposition of the electrode material onto the workpiece.

30 Claims, 8 Drawing Figures

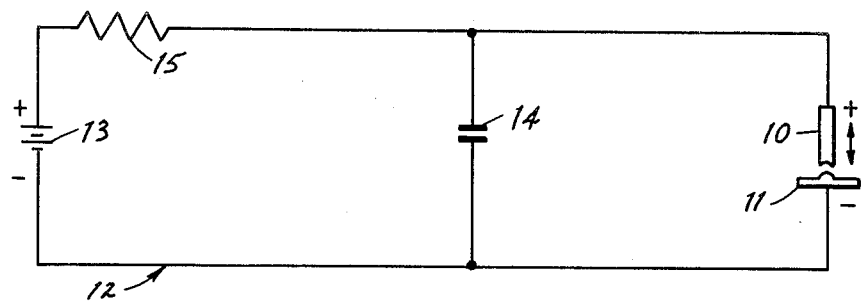
Prior Art  FIG 1
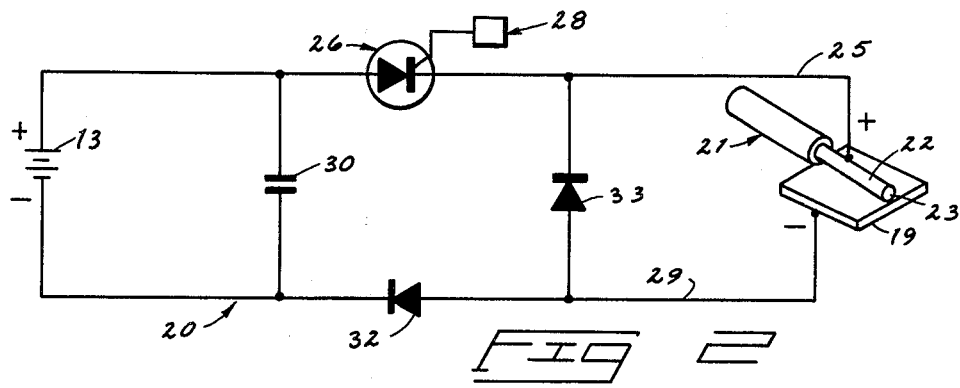
FIG 2
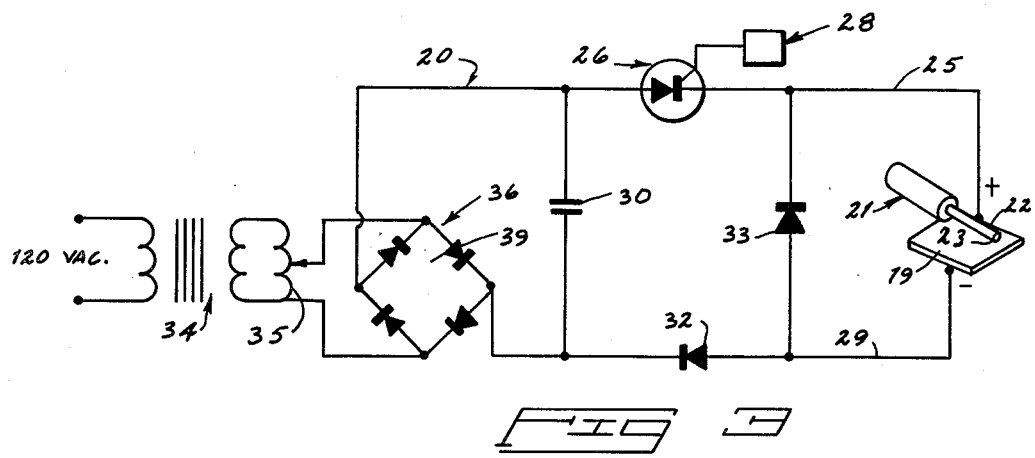
FIG 3

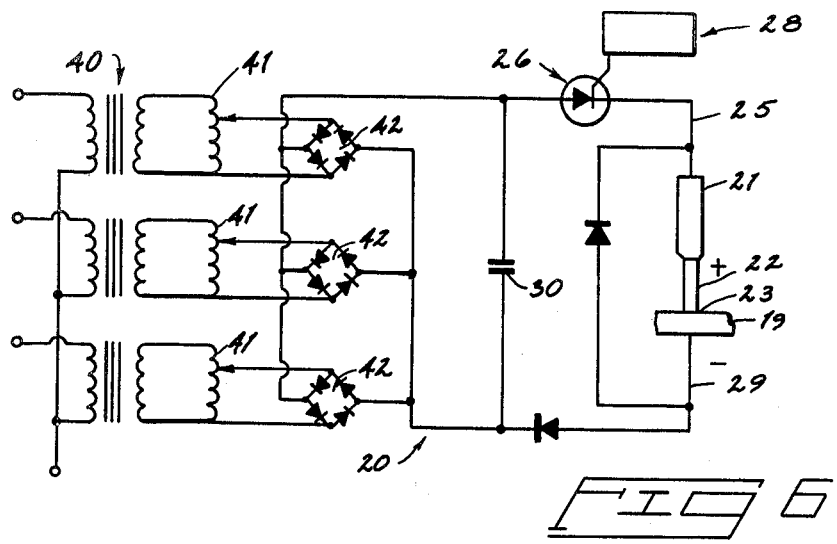
FIG 6
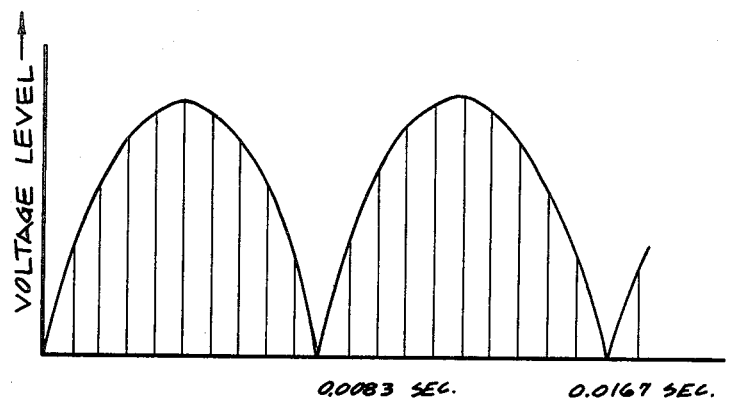
FIG 7
FIG 8
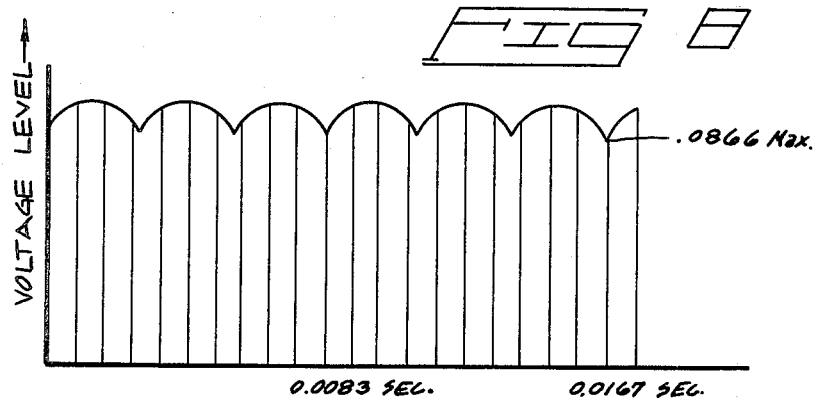

APPARATUS FOR TRANSFER OF METALLIC MATERIALS BY ELECTRIC DISCHARGE

BACKGROUND OF THE INVENTION

The present apparatus and process relate to coating of a conductor by electrodeposition processes and more particularly to "spark" electrodeposition.

The phenomenon of metal transfer by short duration electric discharge applied repetitively at a rate usually greater than 50 cycle per second has been known for over 200 years. The actual mechanisms involved in material transfer by electrodeposition is subject to speculation. However, it is usually assumed that a gas bubble forms about the spark discharge and persists for a time longer than the spark itself. Metal melted due to the high temperature of the spark is transferred from the electrode to the workpiece surface via the expanding gas bubble. Generally, maximum material transfer is made by moving the electrode over the workpiece and by making the electrode the anode and the workpiece surface the cathode of the discharge circuit. Another reason for providing relative motion between the electrode and workpiece is the need to continually fracture the adhesive junctions forming as the electrical discharges occur and the molten metal deposits and solidifies.

Both electrode and workpiece are conductive and form the terminal poles of a direct current power source. Linear vibration of the electrode is commonly used to provide relative motion between the two poles. It is typically achieved by mounting the electrode to the armature of a solenoid. Typical operation of such a solenoid is 120 cycles per second.

Alternate motions of the electrode have been attempted, including rotation of the electrode about its axis and combinations of rotation and linear vibration to provide intermittent contact with the surface, thereby causing repetitive electrical discharges.

The individual discharges through the electrode must be of short duration (less than 100 microseconds) and the energy level at 0.01 to 4 joules for material transfer to satisfactorily occur. A condition known as arcing occurs when the electrical discharge is of low intensity and long duration. Duration of the spark during arcing can be of a magnitude of one hundred times longer than is desirable for spark deposition purposes. It therefore becomes very desirable to minimize the duration of the spark while maintaining the selected energy level for proper deposition.

Furthermore, mechanical restrictions of vibrating mechanisms used with prior electrode combinations limit the vibrating frequency to about 100 Hz. The combination of long pulse duration and slow pulse frequency has often resulted in unacceptable transfer of electrode material onto the workpiece.

E. H. Thornton and R. G. Davies in an article in "Metals Technology" copyrighted 1979 by the Metals Society, 1 Carlton House, Terrance, London SW1Y5DB discloses a "high-rate spark hardening" of hot-forging dyes in which a fast capacitive discharge is achieved by switching the circuit by a thyristor (SCR) that is fired when a level of charge is detected in an associated discharge capacitor. Resistance in the circuit is kept low to increase the discharge energy. The total charge-discharge cycle occupies a space of approximately 250 microseconds with a spark frequency of about 4 kHz. The results are reported as being more satisfactory than were previously achieved with mechanical solenoid vibration systems. The article discloses an application method by which the electrode is rotated at a speed about 100 revolutions per minute to avoid "sticking" of the electrode to the work surface. A commutator provides electrical contact between the discharge circuitry and the rotating electrode. Although resistance through the commutator and "built-in" resistances in the circuitry occurred, an application rate increase to approximately nine square centimeters per minutes was obtained.

U.S. Pat. No. 3,097,291 to Adcock discloses a method for depositing a hard metal such as carbide on a workpiece such as a shaping tool through electric sparking. Adcock provides a capacitive discharge circuitry designed to discharge through a hard metal anode in contact with the conductive workpiece. The discharge is controlled by one or more electronic switches such as thyratrons, that are cyclically charged to uniform energy levels. When the thyratrons become conductive, the capacitors will discharge through them and through primary windings of a transformer. This causes discharge between the sparking anode and the workpiece. Specific disclosure is made of a three phase circuitry so each capacitor is charged fully before cyclic discharge. Again, a rotating or sliding electrode is disclosed for applying the discharges. Additionally, resistance is placed in the circuitry, presumably for the purpose of charging the capacitors. The rate of pulsation is stated to be at 100 pulses per second.

U.S. Pat. No. 3,316,381 to W. W. Gibson discloses a power supply and method for metal surfacing. Gibson discloses use of a three phase circuit using a single capacitor in series feeding an inductor. Secondary winding of the inductor is connected to an electrode. Gibson does not disclose a switching circuit per se of the capacitive discharge type but, rather, a capacitive-conductive oscillator circuit to produce electrical resonance for opening and closing the circuit. The electrode is held some distance from the workpiece to produce an open spark gap. This gap can be varied to correspondingly vary the characteristics of the surfacing. However, the electrode cannot be placed constantly in direct contact with the electrode due to the nature of the circuit. Lack of resistance between the power supply voltage and capacitor or a positive, "off-on" switch between the capacitor and electrode results in "long time" arc durations that are possibly acceptable for heavy duty surfacing applications resembling arc welding, but cannot be made workable in smaller scale operations.

British Pat. No. 756,727 to Rudorff discloses improvements relating to working electrically conductive materials by electric erosion. Here, the capacitive discharge circuitry makes use of diodes to avoid intermittent cyclical reversal of current. A somewhat similar circuit arrangement is illustrated in U.S. Pat. No. 3,036,197 to M. Bruma. Bruma, however, is primarily concerned with an apparatus for protecting the associated components of the device in a short circuit situation.

U.S. Pat. No. 3,277,266 to Blaszkowski discloses apparatus for hard coating metal surfaces. This device is intended to accurately support an electrode with controlled contact pressure as it moves over the surface being treated. Provisions are also made for both vibrating and rotating the electrode during discharge deposition. In fact, it is maintained that simultaneous vibration and rotation produce a superior surface finish.

U.S. Pat. No. 3,277,267 to Blaszkowski discloses a method and apparatus for treating electrically conductive surfaces. This disclosure deals with various types of apparatus for treating conductive surfaces by intense localized heating. Blaszkowski discusses the value of utilizing a capacitive discharge circuit to avoid "arcing" and for extinguishing the arc when the electrode is pulled from contact with the workpiece. With such circuitry, the electrode will discharge across the point of contact rather than across a gap as in arc welding. Another stated advantage is that heat is not generated continuously. The patent, however, deals primarily with the sliding motion of the electrode parallel to the workpiece. Discharge is accomplished by contact at individual small "high points" along the workpiece surface. It can therefore be theorized that only the high points along the workpiece surface receive the deposits of electrode material. Furthermore, the workpiece surface must necessarily be rough in order for the "high points" to exist. Frequency of discharge is varied by altering the rotational speed or sliding motion of the electrode. The capacitor is said to recharge as the contact region shifts from one point to another. Current flow discharge time is stated to be from 15 to 40 microseconds. A variable resistor permits regulation of the discharge current to the electrode. Furthermore, the discharge time has a substantial effect on the charge. Blaszkowski discusses several electrical and mechanical means by which the circuit is discharged other than by "point-to-point" contact between the electrode and workpiece. Among the various other devices, Blaszkowski discloses the use of a thyratron tube or controlled rectifiers operating within a range of 200 to 50,000 cycles per second. Such switching allows the capacitors to recharge without discharge current flow that can otherwise occur. Mechanical switching, however, using a cam braker system is preferred.

U.S. Pat. No. 3,617,680 to Grosskopf discloses a circuit utilizing thyristors to shunt current away from a spark gap when a short circuit is detected. A thyristor is also used in series with a capacitor to produce a current in the spark gap that opposes the short circuit current. The circuitry here is used in a process for removing material from a workpiece rather than depositing the material from the electrode.

U.S. Pat. No. 3,098,150 to Inoue discloses a spark discharge metal depositing apparatus using a vibrating electrode mechanism that is energized by the same pulse that discharges the condensor. Brush or commutator contact with the electrode is shown in FIG. 10 of the drawings. Isolation of power sources is also shown to provide power to drive the vibrator and sparking electrode semi-independently. One of the objects of the Inoue device is to provide an apparatus that is automatically self-regulating without requiring mechanical-electrical switching devices in order to control flow of current. Inoue emphasizes that no other switching mechanism is required.

U.S. Pat. No. 3,969,601 to Rocklin discloses a machine for performing eroding or treating functions on a metal workpiece. The metal treating circuitry of this device includes the typical resistance-capacitance (RC) circuit for spark generation in the metal treatment mode. Load sensing apparatus is used to determine feed rate and spark quality.

U.S. Pat. No. 3,524,596 again to Rocklin discloses a device for depositing a thin layer of hard conductive material such as tungsten carbide onto a conductive surface. A mechanism is provided to allow interchanging of electrodes and operation as a "percussion" welder in which the electrode is driven forcibly against the workpiece. The electrode is then withdrawn quickly to break electrical contact so that a portion of the electrode material will be pulled away from the electrode and deposited on the workpiece surface. The usual RC circuit is involved for producing the high current discharge.

The Rocklin device is adapted for use with a hand-held electrode "gun". Other U.S. patents showing similar vibrating or rotating hand-held electrode deposition apparatus are: 3,763,343 to Rocklin; 3,614,373 to Skilling; 3,415,971 to Shaffer; and 3,415,970 to Cline. All disclose RC or LC (inductance-capacitance) circuits for producing the current pulsations.

The circuitry of my invention makes use of a thyristor for controlling discharge of a capacitor in a low resistance discharge circuit. The thyristor is capable of discharging the capacitor through a positively biased electrode, depositing a minute amount of material on the negatively biased surface of the other conductor. The thyristor is triggered or made to conduct by an independent source, producing trigger pulses. The thyristor will turn off or stop conducting when current direction reverses in the circuit due to inherent inductance and capacitance (LC). By using the thyristor and reducing current reversal within the circuit, I am able to eliminate need for a ballast resistor in the circuit that would be otherwise required for charging of the storage capacitor. The electrode in the current apparatus is oscillated about a central axis to provide moving contact with the workpiece. The oscillating electrode can be moved over the workpiece surface in any desired direction to deposit the electrode material onto the workpiece surface. Axial oscillation of the electrode, coupled with the rapid capacitance discharge capability of the circuit, results in a quality coating of the workpiece without requiring accurate electrode positioning control or maintaining a specific workpiece-electrode gap.

BRIEF DESCRIPTION OF THE DRAWINGS

FIG. 1 is a schematic view of a prior art electric spark deposition apparatus;

FIG. 2 is a schematic view of the present apparatus and circuitry for use with direct current;

FIG. 3 is a view of the present apparatus and associated circuitry for use with alternating current;

FIG. 6 is a schematic view illustrating the present invention adapted for use with three phase power;

FIG. 7 is a diagram illustrating the voltage level-time curve using single phase 60 cycle AC power and full wave rectification; and FIG. 8 is a diagram similar to FIG. 5 only showing rectified voltage available when using three phase 60 cycle AC power.

DETAILED DESCRIPTION OF A PREFERRED EMBODIMENT

Figure 4:
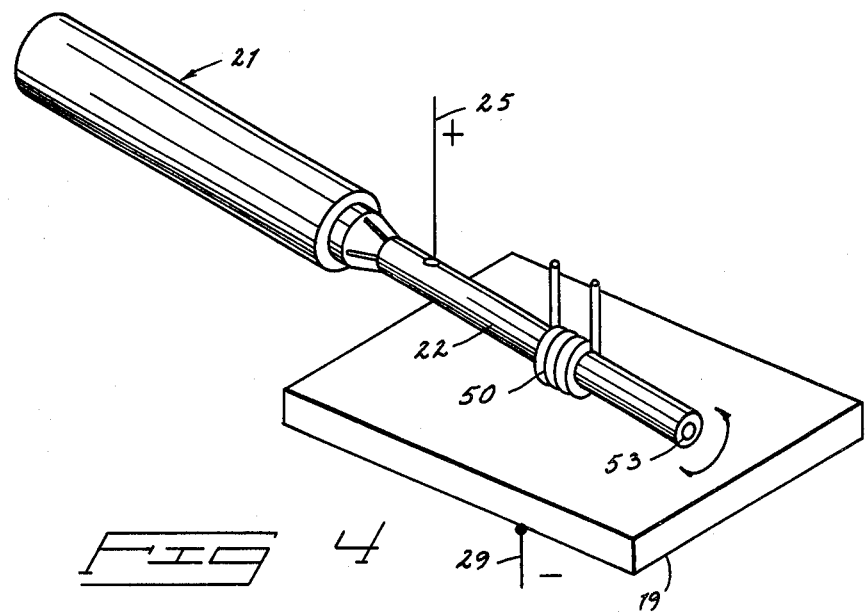
FIG. 4 is an enlarged view of the electrode and mechanism for oscillating and cooling the electrode.
Figure 5:
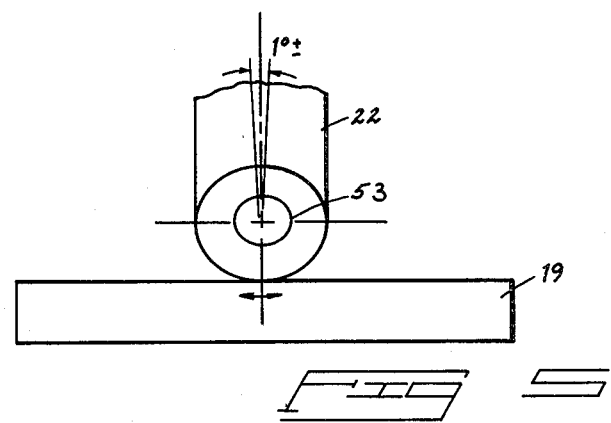
FIG. 5 is a fragmentary schematic view illustrating the angle through which the electrode is oscillated.

Electrical discharge deposition occurs at contact between an electrode and conductive workpiece when the voltage potential between one conductor, such as an electrode 10 and another conductor such as a workpiece 11 exceeds a critical value (FIG. 1). The typical prior form of circuitry shown in FIG. 1 is used in conjunction with a vibrating electrode 10 to repeatedly produce the critical voltage potential between the electrode and workpiece so a succession of "sparks" result in which molten material pass from one conductor to the other. Generally, the succession of discharges is produced by the action of the vibrating electrode in a suitable RC relaxation circuit 12.

An alternative to the vibrating electrode is an apparatus (not shown) that produces a sliding action alone or a combination of sliding and vibratory action. The discharge or sparking action in this arrangement may occur at minute contact points along the surfaces of the workpiece and electrode or by mechanical or electrical switching. The electrode 10 is typically made to move with respect to the workpiece to stop adhesion and welding of the electrode to the workpiece in addition to the circuit "switching" function described above.

The desired high energy short duration spark is produced by inserting a capacitor 14 in parallel with a source 13 of direct current. A ballast or load resistor 15 is provided in series along the positive lead of the circuit, which is also connected to the electrode 10. The negative lead of the circuit is connected to the workpiece. If "erosion" rather than deposition is desired, the leads are reversed and the conductors (electrode and workpiece) are submerged in a liquid. The circuitry remains basically the same.

Molten metal produced by the high temperature spark is transferred from the anode electrode 10 to the cathode workpiece of the circuit possibly by an expanding gas bubble. It should be emphasized that the mechanism of electrical discharge material transfer is complex. It involves not only ionic transfer of material from anode to cathode, but also alloying of the deposited materials with nitrogen and oxygen from the surrounding air.

It is well known that the discharge must be of short duration (less than 100 microseconds) and of a high energy level for material transfer to satisfactorily occur. A condition known as "arcing" occurs when the electrical discharge is of low intensity and long duration. The duration of spark during arcing may be as much as 100 times longer (five to ten miliseconds or more) than is preferred. Arcing also prevents the capacitor from recharging to the full potential of the supply voltage between discharge periods, hence a low intensity spark results.

Repetitive high intensity electrical discharge processes can be used to either deposit metal or to remove metal depending primarily on the polarity of the tool-workpiece combination. It should therefore be understood that the apparatus disclosed herein can be useful for performing both functions, requiring only minor alterations of the mechanisms used. For purposes of this description, however, the device will be discussed in terms of an apparatus for depositing material from electrode 10 onto workpiece 11.

A primary requirement for effective material transfer is that no current pass in the gap between electrode and workpiece during the time between discharges and that electrical discharge must occur only when the capacitor has stored an optimum amount of energy. In order to prevent the undesirable effect of long term low voltage discharge with assurance of maximum energy storage in the capacitor (between periods of electrode contact), the resistance used and the spacing at the gap between electrode and workpiece must be correctly chosen.

FIG. 1 shows the direct current source 13 connected at all times to the electrodes through the series resistance 15. Using the fact that the duration of discharge is small compared with the time available for energy buildup between discharges in the capacitor, an optimum value for the gap distance between electrode and workpiece can be calculated. This will maximize energy transmitted to the capacitor through the charging circuit 12. The value of the resistance must also be chosen to be large enough so that continuous current or arcing is prevented after initial gap breakdown (capacitor discharge). It is desirable to choose the smallest resistance that will prevent arcing because the lower resistance of the circuit results in higher maximum power transmitted to the capacitor during charging. This is an inherent difficulty with the typical form of charging circuit as shown in FIG. 1. This difficulty is substantially eliminated by the circuitry of the present invention. Another disadvantage in vibrating or sliding the electrode is eliminated by the apparatus of the present invention as described below.

The present circuitry and electrode clamping apparatus are shown diagrammatically in FIGS. 2 through 6. FIG. 2 shows the apparatus used in conjunction with a direct current supply. FIG. 2 shows the same apparatus adapted for use in conjunction with an alternating current source. FIG. 6 shows the same apparatus adapted for use with three phase alternating current. The operating principles of the three examples shown are substantially identical.

The present invention operates without use of a ballast or load resistor 15 that is typically found in the prior art circuits. Instead, it has been found that a more efficient discharge process will occur if as much electrical resistance and inductance as possible is eliminated. It is also found to be advantageous to control capacitor discharge by a suitable high speed thyristor switch. High frequency switching can be used to open and close the capacitor workpiece-electrode circuit. The high speed switch will discharge the capacitor through the electrode as it continuously touches the workpiece at a rate controlled by the frequency of the closure. Note that this rate is independent of the speed at which the electrode oscillates and is moved over the workpiece surface. Control of the discharge rate has been found to be an important parameter for optimizing coating quality.

The basic circuit component assembly for the present invention is shown at 20 in FIGS. 2, 3, and 6. The circuit includes a powered clamp means 21 for holding and oscillating an electrode 22 about a center axis. Direct contact is made at 23 between the oscillating electrode 22 and a workpiece 19 of a conductive material. Direct contact is also made between the electrode 22 and a positive lead 25 of the circuit. Such direct contact is possible since the electrode merely oscillates. Electrode rotation or sliding motion would necessitate that commutators or brushes be used to maintain contact with the electrode.

The switching means shown generally at 26 is supplied in the circuit for successively opening and closing the circuit at a prescribed rate. This rate can vary with the rate of pulsation or operation of the switch in cycles between one and ten thousand pulses per second. It is preferred, however, that the switch cycling be controlled in the range of approximately 5,000 pulses per second to avoid excessive heating between the electrode and workpiece.

It is preferred that the switching means 26 be supplied in the form of a thyristor in series with the positive lead 25. An independent trigger pulse generator 28 of conventional form can be supplied and connected to the thyristor for producing the selectively spaced impulses to "fire" the thyristor. It is emphasized that this rate is independent of the speed at which the electrode moves in relation to the workpiece surface.

The negative lead 29 of the present circuit is connected in parallel with a power source to the positive lead through a capacitor 30. The capacitance value selected for the capacitor may be selected according to the discharge requirements, varying between 2 and 800 microfarads.

Current reversal through the electrode-workpiece contact area is detrimental to good deposition and lessens the wear resistance of the resulting coatings. Since the electrical circuit described is oscillatory by nature, I counteract such reversal by use of two diodes 32 and 33 placed as shown in FIGS. 2, 3, and 6. Diode 32 is situated closely adjacent the capacitor to prevent reversed current flow through the connecting lead 29 and to protect the thyristor against this condition. Diode 33 is placed across the electrode and workpiece as near as possible to the point of contact 23 to prevent current reversal through the electrode contact point.

Generally, it is more convenient to use a readily available alternating current source and a full wave rectifier means 36 as shown in FIGS. 3 and 6, rather than pure direct current battery source as shown in FIG. 2. The apparatus in FIG. 3 consists of an alternating current transformer 34 having primary windings connected to an AC, 60 cycle source. The secondary winding of the transformer 34 is connected to a variable transformer 35. The variable transformer 35 is used for controlling the voltage level at the electrode 22. The secondary winding of the variable transformer is connected to the rectifier means 36, shown as a full wave bridge rectifier 39 which provides current for charging capacitor 30.

Using conventional 60 cycle power, the rectified voltage available to the capacitor will have a sine wave form as shown in FIG. 7. The period will be 0.0083 seconds for 60 cycle power. Since the capacitor discharge is many times faster than the period of the rectified 60 cycle AC power, the capacitor will be charged to various voltage levels during the deposition process. These voltage levels are bounded by the rectified sine wave voltage level available at charge time. This charge level is indicated by the vertical lines in FIG. 7. The particular lines shown correspond to a trigger pulse rate of 1,200 pulses per second. The result is that the storage capacitor will be charged to levels between zero volts and its peak AC voltage and the resulting voltage between the electrode and workpiece will be between these levels.

Since electrode material transfer characteristics are closely related to the discharge voltage, the varying charge voltage available by using rectified single phase AC voltage results in merely acceptable material transfer.

A very much improved rectified voltage wave form will result by using three phase power and a three phase rectifier as shown in FIG. 6. The circuit is similar to the single phase circuit of FIG. 3 except that a three phase power supply is used with a line isolation transformer 40, variable transformers 41, and full wave bridge rectifiers 42 for each of the three phases. The output of the three rectifiers are connected in parallel and all feed a single capacitor 30 as described above for both the direct current and 60 cycle AC circuits. The rectified voltage wave form for this three phase circuit is shown in FIG. 8.

The single storage capacitor 30 is now charged and discharged at a much more constant level as shown by the vertical lines in FIG. 8, representing the triggering rate of the thyristor controlling capacitor discharge. The lowest voltage level is shown to be 0.0866 of the maximum level instead of zero. Consequently, the spark voltage is nearly always consistent at a set level and the resulting quality of material deposition is greatly enhanced.

An alternative method of obtaining the advantage of a rectified three phase power using single phase power is to provide a phase shifting network (not shown) or machinery to split single phase AC power into three AC sine waves, leading each other by phase angles of 120°. Capacitor-inductor networks are exemplary of methods for providing this phase shift. The power requirements of this circuit are modest (5 amps or less at 120 volts) and the shifting network can be designed by using well known techniques. The phase shifted AC waves would then be connected to the primary windings of three isolation transformers exactly as when using three phase power as shown in FIG. 6.

It is again pointed out that the circuit resistance of the general capacitor charging circuit 20 shown in FIGS. 2, 3 and 6 is held at a minimum. Furthermore, the circuit impedance is also minimized by proper selection of components. This results in several advantages. First, power losses are reduced with reduced resistance. Additionally, the rate of charging the capacitor by the power supply is increased to a very large degree, hence more rapid discharge rates are possible. Further, the capacitor is charged to the full value of the supply voltage, not some lower value determined by the RC time constant of the system. Since material transfer increases with electrode voltage, it is desirable to raise this voltage to its maximum practical value.

The above advantages become amplified through use of the thyristor 27 and its independent trigger pulse generator 28. With the switching means 26, capacitor discharge occurs with the electrode in intimate contact with the workpiece surface. Threfore, there are no energy losses across an air gap or other high resistance path. Additionally, there is no requirement of a specified pressure applied between the electrode and workpiece nor is the rate of movement between the electrode and workpiece a critical factor. Electrodes need only be in direct contact with the workpiece for the circuit to properly function. Additionally, the frequency of the capacitor discharge is set by the condution rate of the thyristor 27. This discharge rate is therefore a controllable variable, independent of the relative rate of motion between the electrode and workpiece and can easily be optimized for any particular operation. As stated above, the trigger pulse rate can be varied almost indefinitely but is preferably set between one and ten thousand cycles per second.

With the invention as described, it is possible to obtain larger amounts of material transfer, i.e. larger quantities of electrode material deposited on the substrate surface and also to achieve an effective wear resistant surface.

For example, using a capacitance value of 50 microfarads charged to 75 volts, a deposition rate of 25 mg/min is obtained. The energy stored and released at each discharge is only 0.141 joules.

Discharge time varies, of course, for the capacitance and inductance of the circuit. Typical conditions involve 2 to 5 microseconds per capacitor discharge. I have found that preferable discharge duration, however, to be approximately 5 microseconds, a figure substantially below that used with all known prior forms of spark deposition apparatus.

The inductance of the discharge circuit including the capacitor leads and electrodes should be kept below 1.0 microhenry. In fact, values of 0.25 microhenrys or less are desirable.

With the above fast charge and discharge provisions, devices have been constructed to deposit extremely wear resistant metallic coatings on conductive substrates. Surfaces having 500 times more resistance to wear than low carbon steel, as tested in a rotating pin machine, have been produced.

During many prior surfacing processes with known deposition equipment, there has been a tendency for the electrode to stick to the workpiece due to microwelds that are formed. This has been a significant problem, especially with the prior forms of spark deposition apparatus wherein relatively long duration discharge is used. To prevent this, the electrodes were made to vibrate, slide or rotate during pulsations. This leads to an improvement upon the electrode sticking problem. However, further difficulty arises with the method of electrical contact between the electrode and circuitry. For rotation of the electrode, a slip-ring or commutator must be used. Resistance through this type of electrical connection is substantial and unacceptable when low circuit resistance is desirable. For rotation, the detrimental effect is lack of continuous electrode contact.

The present apparatus makes use of an oscillating electrode as a solution to the electrode welding problem and also to the electrical connection problem between the electrode and discharge circuitry.

I have found in using the above described circuitry that a small amplitude, high frequency electrode oscillation about its longitudinal axis 50 (FIGS. 4 and 5) works especially well to prevent sticking from occurring while allowing direct electrical contact with the circuitry (FIG. 4). Continuous contact with the workpiece can be maintained while the oscillation occurs. The motion is shown specifically in FIG. 5.

Small amplitude oscillations between one and ten degrees, preferably in the range of five degrees, are sufficient. During one hundred cps oscillation, many discharges will occur through the electrode with each arcuate motion of the electrode about its axis 50. It can be theorized that with each discharge, a minute amount of molten electrode material is transferred in a wiping motion onto the substrate. Depending upon the linear motion of the electrode or the workpiece surface, the return oscillation motion will result in additional deposits made on the substrata between previously deposited material and on the previously deposited material itself.

The result is a "two coat" action with a single pass of the electrode. The opposed "wiping" motions of the electrode disrupt directional orientation or alignment of the deposits and therefore may create a more homogenous coating.

Another advantage using the oscillating electrode is realized in applications of higher current discharges where cooling of the electrode may become necessary. A coil 50 is shown in FIG. 4 to diagrammatically illustrate means for cooling the oscillating electrode. The coil can be placed in direct contact with the electrode for more efficient heat conduction. Oscillation of the electrode through its short arc can be accomodated by providing flexible connections to the coil. An alternative to the coil shown is a water jacket surrounding the electrode length (not shown) while leaving the tip thereof exposed. Such cooling has been found to be effective, especially in high current applications where direct contact between the electrode and cooling means enables substantially higher working currents and frequencies that would be intolerable with the prior forms of equipment.

FIGS. 2–5 show the electrode 22 oriented at an acute angle to the surface of the workpiece 19. This relationship is functional when relatively large surface areas are to be treated by a hand-held oscillator unit 21. The rather sharp contact point 23 can be moved in any desired direction over the workpiece surface. FIG. 6, however, shows the workpiece surface and electrode in a perpendicular relationship. The flat end of the electrode here will fit flush against the workpiece surface, rather than the sharp point of contact described above. The perpendicular relationship lends itself to mechanical control of the unit 21, and has proved very effective in experimental use. The electrode 22 when used perpendicularly with the workpiece 19 will include a central bore 53 (FIG. 5) to avoid welding to the workpiece at the electrode center where there would be no relative motion between the electrode and workpiece. The bore can also be used for transmitting coolant or a selected gas to the contact point.

The above description and attached drawings are given by way of example to set forth various forms of the present invention.

Having thus described my invention, what I claim is:

1. Apparatus for transferring material from one metallic conductor to another metallic conductor by electric discharge deposition, comprising:
   a capacitive charging circuit;
   switching means connected in the circuit for successively discharging the circuit at a prescribed rate;
   wherein one of said conductors is an electrode having a central axis;
   said circuit having positive and negative discharge leads operably connected to a source of direct current electrical power, one lead being directly connected to the electrode and the other being adapted for connection to the other conductor, so contact between the electrode and other conductor will complete the circuit when said circuit is being discharged by said switching means; and
   powered clamp means for reversibly oscillating the electrode continuously about the central electrode axis through a prescribed arc of less than 360 degrees.

2. The apparatus as claimed by claim 1 wherein said powered clamp means is operable to oscillate the electrode through an arc of between 1° and 10°.

3. The apparatus as claimed by claim 2 wherein said powered clamp means is operable to oscillate the electrode through an arc of approximately 5°.

4. The apparatus as claimed by claim 1, wherein the discharge rate of the circuit as controlled by the switching means is between 1 and 10,000 pulses per second.

5. The apparatus as claimed by claim 4 wherein the discharge rate of the circuit as controlled by the switching means is approximately 5000 pulses per second.

6. The apparatus as claimed by claim 1 wherein each discharge of the circuit has a duration of approximately 5 micro-seconds.

7. The apparatus as claimed by claim 1 further comprising cooling means adjacent the electrode for cooling the electrode when in use.

8. The apparatus as claimed by claim 1 wherein said circuit includes:
   a capacitor in parallel with the leads;
   and wherein the switching means includes a thyristor in series with one of the leads;
   a first diode operatively connected across the two conductors; and
   a second diode operatively connected back-to-back with the first diode and being wired between the first diode and the capacitor.

9. The apparatus as claimed by claim 8 wherein the first diode is situated closely adjacent to the conductors to prevent excessive current reversal between them.

10. The apparatus as claimed by claim 8 wherein the second diode is situated near the capacitor to prevent reverse current flow through the leads and to protect the thyristor against excessive current reversal.

11. The apparatus as claimed by claim 8 wherein a pulse generator is connected with the thyristor to trigger the thyristor to open and close the capacitive charging circuit when the conductors are in contact.

12. The apparatus as claimed by claim 8 wherein the leads have low inherent resistance and inductance.

13. The apparatus as claimed by claim 8 wherein the capacitor has low internal inductance.

14. The apparatus as claimed by claim 13 wherein the capacitor size is between 2 and 800 microfarads.

15. The apparatus as claimed by claim 8 wherein the source of direct current electrical power comprises:
   full wave rectifier means adapting the apparatus for use with alternating current and for providing rectified current for charging the capacitor.

16. The apparatus as claimed by claim 15 wherein the full wave rectifier means includes:
   a full wave bridge rectifier connected in parallel with the leads to direct rectified current to the capacitor; and
   wherein an alternating current transformer is provided in the circuit having primary windings adapted to be connected to a source of alternating current and secondary windings connected to the full wave bridge rectifier.

17. The apparatus as claimed by claim 16 wherein the second windings of the alternating current transformer are connected to a variable transformer, having secondary windings connected to the full wave bridge rectifier.

18. The apparatus as claimed by claim 8 further comprising:
   three phase rectifier means adapting the apparatus for use with three phase current and for providing a rectified wave voltage for charging the capacitor.

19. The apparatus as claimed by claim 18 wherein a line isolation transformer and a full wave bridge rectifier is provided for each of the phases of three phase current;
   and wherein the transformers and rectifiers are connected in parallel with the capacitor.

20. The apparatus as claimed by claim 19 wherein a variable transformer is provided for each line isolation transformer and is connected between the line transformer and variable transformer to selectively vary voltage to the capacitor.

21. A process for transferring material from an electrically conductive electrode to a conductive workpiece by electric discharge, comprising the steps of:
   producing a succession of high current short duration electrical pulsations at a pair of discharge terminals in a capacitive discharge circuit;
   directly connecting one of the terminals of the circuit to the electrode;
   connecting the remaining terminal of the circuit to the workpiece;
   directly contacting the workpiece with the electrode;
   and reversibly oscillating the electrode about a central axis through a prescribed arc of less than 360 degrees against the workpiece.

22. The process as claimed by claim 21 wherein the step of oscillating the electrode is accomplished by moving the electrode in a first direction about the axis through an arc including between 1° and 10°, and subsequently moving the electrode back through the same arc in an opposite direction.

23. The process as claimed by claim 22 wherein the step of oscillating the electrode is accomplished by moving the electrode about the axis in the first and opposite directions through an arc of approximately 2°.

24. The process as claimed by claim 21 wherein the step of producing a succession of high current pulsations is accomplished at a rate between 1 and 10,000 pulses per second.

25. The process as claimed by claim 24 wherein the step of producing a succession of high current short duration pulsations is accomplished at a rate of approximately 5,000 pulsations per second.

26. The process as claimed by claim 25 wherein the step of producing a succession of high current short duration pulsations is accomplished with the pulsations each having a duration of approximately 5 microseconds.

27. The process as claimed by claim 21 comprising the further step of cooling the electrode as it is being oscillated about its central axis.

28. The process as claimed by claim 27 wherein the step of cooling the electrode is accomplished by circulating a cooling fluid through a stationary tubular coil about the electrode axis near the electrode.

29. The process as claimed by claim 21 wherein the workpiece includes a surface for engaging the electrode and including the further step of holding the electrode substantially perpendicular to the workpiece surface.

30. The process as claimed by claim 21 wherein the workpiece includes a surface for engaging the electrode and wherein the electrode includes an axial interior bore coaxial with the central axis, and including the further step of holding the electrode substantially perpendicular to the workpiece surface.

* * * * *